Figure 1:
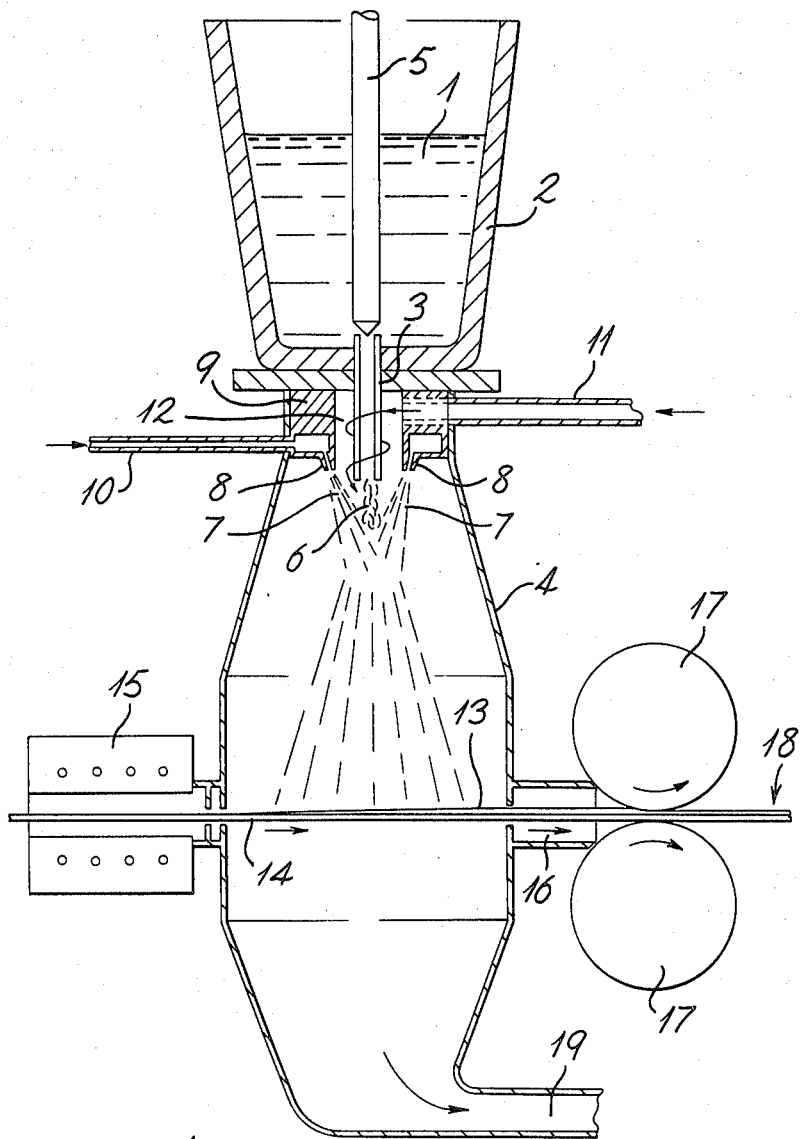

United States Patent [19]

Singer

[11] 4,420,441

[45] Dec. 13, 1983

[54] METHOD OF MAKING A TWO-PHASE OR MULTI-PHASE METALLIC MATERIAL

[75] Inventor: Alfred R. E. Singer, Swansea, Wales

[73] Assignee: National Research Development Corp., London, England

[21] Appl. No.: 466,474

[22] Filed: Feb. 15, 1983

[30] Foreign Application Priority Data

Feb. 23, 1982 [GB] United Kingdom ............... 8205347
Jul. 20, 1982 [GB] United Kingdom ............... 8220970

[51] Int. Cl.³ .............................................. B29C 6/00
[52] U.S. Cl. ....................................... 264/7; 264/12; 264/13; 264/14
[58] Field of Search ...................... 264/7, 12, 13, 14

[56] References Cited

U.S. PATENT DOCUMENTS 3,655,837 4/1973 Reed et al. .............................. 264/7
3,963,811 6/1976 Tamura et al. ........................ 264/7

FOREIGN PATENT DOCUMENTS 1262471 of 1972 United Kingdom .
1359486 of 1974 United Kingdom .

Primary Examiner—James R. Hall
Attorney, Agent, or Firm—Cushman, Darby & Cushman

[57] ABSTRACT

A two-phase material comprises a higher-melting phase dispersed in a lower-melting matrix. The material made by the method is new since, although it consists of particles of a higher-melting-point phase (e.g. iron) dispersed in a lower-melting-point matrix (e.g. aluminium), the particles being of a material soluble in the matrix at the melting-point of the matrix, no perceptible dissolution of the particles is evident in the material. Such materials may find application as friction materials, for example, in brake pads, stair edging, decking and industrial flooring. The method comprises forming a spray of molten matrix material, introducing the particles into the spray, and directing the spray onto a colder surface to solidify the matrix spray and form the multi-phase material; the method is particularly characterized in that the temperature of the spray is below the melting point of the particles, with the result that, despite the notional solubility of the particles material, no perceptible dissolution of the particles occurs. Rapid solidification is helpful in assisting to achieve this result. Thus, the particles are in contact with molten material for a duration of preferably not more than 100 ms. To ensure this, the cooling rate of the matrix in the region of the solidus is preferably at least $10^3$ K/s, more preferably at least $10^4$ K/s.

17 Claims, 2 Drawing Figures

METHOD OF MAKING A TWO-PHASE OR MULTI-PHASE METALLIC MATERIAL

This invention relates to a method of making a two-phase metallic material; other phases can be added in the method to make a multi-phase metallic material. The two-phase material comprises a higher-melting phase dispersed in a lower-melting matrix. The material made by the method to be described is itself a new product since, although it consists of particles of a higher-melting-point phase (e.g. iron) dispersed in a lower-melting-point matrix (e.g. aluminium), the particles being of a material soluble in the matrix at the melting-point of the matrix, no perceptible dissolution of the particles is evident in the material. For example, sharp-edged chilled iron particles may be dispersed in an aluminium matrix, not only with their sharpness preserved, but also such that analysis of the matrix near the particles will fail to detect any significant quantity of intermetallic Al/Fe compound. Such materials may find application as friction materials, for example, in brake pads, stair edging, decking and industrial flooring. Other possible materials, such as aluminium, copper, low carbon steels or stainless steels containing lead or graphite particles which are not perceptibly dissolved, may have applications for bearings and wear resistant components.

Hitherto such materials have been impossible to make except by extreme techniques such as shockwave consolidation of powders using either explosives or the impact of a high-velocity projectile. These techniques are costly, dangerous and unsuited to continuous production or to the manufacture of thin sheet or strip and yield a product which is not the same as the product of the present method, as will be explained.

Dispersions of high-melting but soluble phases in low-melting matrices are not new since some meteorites, on metallographic examination, have been found to contain 'Widmanstatten structures', wherein a solute phase forms a precipitate in preferred orientations in a (solid) solvent phase, but there the solvent is saturated with solute, unlike the product of the present method.

A spray method of depositing a composite material is known from British Patent Specification No. 1,359,486, but there the dispersed particles were of lead, in an aluminium matrix. Since, to make such a structure, the spray would have to be initially at a temperature above the melting point of aluminium (660° C.), it would also be above the melting point of the lead (327° C.).

A spray method wherein the lead, in effect, was replaced by ceramics such as alumina particles has been proposed in British Patent Specification No. 1,262,471, but since these particles are not soluble in molten aluminium, the aluminium does not wet them; hence in the final composite structure they are retained merely mechanically in the matrix. In addition, while the aluminium matrix is relatively low in cost, ceramic particles (which, for abrasion/friction purposes, must have a good resistance to fracture) are expensive. The cheapest abrasive ceramic is angular quartz or sand but its allotropic changes and relative ease of fracture make it less satisfactory. Silicon carbide and aluminium oxide are excellent, but expensive when supplied as angular particles of suitable size. A cheaper, yet effective, material is crushed "chilled iron grit" or hard alloy steel particles. Such particles are used in large quantities for grit blasting where their abrasive qualities and low cost are highly important.

It has hitherto been difficult to incorporate sharp-edged chilled iron or alloy steel particles satisfactorily or at reasonable cost in an aluminium matrix. For instance, if chilled iron grit is mixed with molten aluminium and then cast, the iron, being denser, tends to settle by gravity and will tend to dissolve in the aluminium, causing rounding of the sharp edges and, ultimately, complete dissolution of the particles. Powder-metallurgical sintering of a mixture of aluminium powder and chilled iron grit would similarly by unsatisfactory because of dissolution of the iron in the aluminium during high temperature sintering. Such dissolution is unacceptable for friction materials, which largely depend for their effect on sharp edges projecting from their surface. Techniques such as shockwave consolidation are unacceptably costly and furthermore yield a structure which could be unsatisfactory; the matrix particles would have unmelted, relatively large, work-hardened centres having a high density of defects, with interparticle melting regions having a microcrystalline structure characteristic of ultra-fast cooling and sometimes even including amorphous regions.

Hereinafter, the expression 'multi-phase' includes two-phase.

According to the present invention, a method of making a multi-phase metallic material comprising elemental or metallic particles of a high-melting-point phase dispersed in a lower-melting-point metallic matrix phase (the particles being of a material which would be soluble under equilibrium conditions in the matrix material at the melting point of the matrix material) comprises forming a spray of molten matrix material, introducing the particles into the spray, and directing the spray onto a colder surface to solidify the matrix spray and form the multi-phase material; the method is particularly characterised in that the temperature of the spray is below the melting point of the particles, with the result that, despite the notional solubility of the particles material, no perceptible dissolution of the particles occurs. Rapid solidification is helpful in assisting to achieve this result. Thus, the particles are in contact with molten material for a duration of preferably not more than 100 ms. To ensure this, the cooling rate of the matrix in the region of the solidus is preferably at least $10^3$ K/s, more preferably at least $10^4$ K/s. As a guide, the fastest practical cooling rate within present-day possibility in this type of method is probably about $10^6$ K/s.

The resulting multi-phase material is optionally separated from the surface on which it was formed. In such a case, the substrate is desirably as cool as practicable, such as about 200° C. (A cooler substrate might bear traces of adsorbed moisture, and suffer distortion.)

The matrix material may be aluminium or an aluminium alloy, such as an aluminium/zinc alloy. The zinc in such a case may serve to reduce the susceptibility of the particles to corrosion. Alternatively, the matrix material may be, for example, copper or zinc or their alloys. Alternatively low carbon steel or stainless steels may be used possibly in conjunction with particles of graphite.

The particles may be for example iron or steel, such as of so-called "chilled iron grit" or steel grit, preferably within the size range of 10–1000 μm. If the particles are sharp-edged when introduced into the spray, as is advantageous for certain applications such as friction materials, the material made by the method set forth above will contain equally sharp-edged particles dispersed in a uniform matrix. It represents an additional 'signature' of the method, beyond the test that the matrix material, even in the vicinity of the particles, contains no significant proportion of the particles material and is substantially homogeneous (unlike the unevenly worked matrix which is characteristic of shock-wave compacted material).

Other examples of particles are silicon and graphite, which may be incorporated in low carbon steels or in alloy steels such as stainless steel such as 18 chromium/8 nickel. Whereas graphite is soluble in steel at high temperatures or forms chromium carbide when chromium is present, in the special circumstances prevailing in the method according to the invention it remains undissolved as flakes of graphite. Moreover, most of the flakes are aligned parallel to the surface when strip is being deposited. Several practical advantages accrue from these new structures such as properties of self lubrication, sound deadening and good machinability.

Two or more types of particle may be used together, and optionally other (e.g. insoluble) materials may be dispersed in the matrix by mixing them with those particles before or at the time of introducing those particles into the spray. Suitable materials might include ceramic abrasive particles, to enhance frictional or abrasive properties, and additionally or alternatively a solid lubricant, such as lead powder or flake or powdered graphite (where these do not otherwise meet the definition of particles which may be added), to lessen the tendency of a friction material to bind or seize.

The method of manufacture is preferably performed by feeding to a gas atomising nozzle a stream of molten matrix material and injecting into the atomised stream particles of the higher-melting phase(s) (preferably by entrainment in a stream of gas). The particles of molten matrix material envelop the (solid) particles of higher-melting material as the molten spray splats on the colder surface. Freezing of the molten splats occurs typically in milliseconds, too fast for perceptible dissolution of the solid particles. However, those particles are fixed rigidly in position by the freezing matrix material. A major advantage of soluble particles over ceramic particles is that the matrix material will wet the surface of the soluble particles whereby they are bonded to the matrix rather than being retained merely mechanically.

The surface on which the composite material is formed is chosen according to end use. Rapid chilling of the deposited spray is advantageous. Where the composite material is to be separated from the surface before use, a cast iron or steel surface, which may be contoured and may be in the form of a rotating drum or wheel, may be used. The separate composite material may subsequently be hot or cold rolled or both in order further to compact the deposit and improve its mechanical properties, provided that the chosen heating cycle does not bring about solution of the notionally soluble particles.

Where, on the other hand, the material is to stay on that surface (to form a bonded laminated product), the surface may be a steel strip base. The steel strip surface should be free from oxide and other contaminants and is preferably held in the range of 200° C.–500° C. during the spraying when the matrix material is aluminium. Wetting and bonding occurs between the matrix and the steel strip to form a laminate consisting of a composite bonded to a metal backing. The product may be used in this form or it may be hot or cold rolled or heat treated in order to improve the density and mechanical properties of the layer bonded to the steel strip. At a strip temperature for example in the region of 400° C., chilling of the splats is still adequate and provided the rate of spraying is not too high, no perceptible dissolution of the particles occurs. Generally, the strip should not be warmer than half the melting point (or solidus temperature) of the splats on the Absolute Temperature Scale, otherwise diffusion of the particles' atoms may become serious.

The proportion of particles in the composite material may be up to two-thirds by volume, and is preferably from 1% to 50% by volume, more preferably 1% to 35% (i.e. one-fortieth to three quarters by weight, in the case of iron particles in an aluminium matrix). If other materials are added to the higher-melting particles, the volume of additives (including those particles) is preferably from 1% to 50% of the composite material. When the volume of additives exceeds about 5%, their effect in tending to cool the spray in flight to the solidus or below can become significant.

In the method, a curtain of high velocity gas is formed around and directed towards a stream of molten matrix metal which is atomised by the gas to form a spray of molten atomised matrix particles, and a supply of the high-melting particles entrained in gas is injected into the spray of atomised particles so as to cause co-deposition of the particles with the matrix on a surface placed in its path, which surface may be moved relative to the atomising nozzle.

The stream of molten matrix metal may be presented to the atomising gas as a column of liquid having approximately a circular cross section or a stream having approximately a rectangular cross section. The particles entrained in the second supply of gas may be in the form of chopped fibres, small granules or fine powder.

It has been found in practice that the particles can very effectively be incorporated to form a co-deposit having a uniform distribution of particles or chopped fibres when they are introduced within the atomising cone of the main atomising jets. A particularly effective method has been found to be the tangential introduction of gas-borne particles into the space between the nozzle delivering the metal stream and the atomising jets of gas. The method has the advantage of ensuring that the particles are completely mixed with and confined within the atomised metal in flight, and that they do not escape without contact with the atomised metal.

The entrainment of particles in a gas stream is a known art of which an example is the incorporation of high melting point metal powders in a gas stream fed to an oxy-acetylene torch used for the hard surfacing of engineering components. The stream of entrained particles may be of low density, i.e. having a large gas/particle ratio, where small percentages of particles are required in the final product, or it may be of high density, i.e. having a small gas/particle ratio when high percentages are required. In the latter case the effect of the gas is to fluidise the particles and allow them to flow freely into the atomising nozzle.

The gas used in this invention for atomising the metal of entraining particles is generally neutral or reducing in nature. An example is the use of nitrogen with aluminium or its alloys. Air may be used in some cases where the oxidation of the metal or the additives is small or when the oxidation products can be tolerated in the finished powder.

Porosity of the deposits depends on the conditions of deposition. A low spray density may give porosity as high as 15% but the use of higher spray densities will lead to porosities as low as 1% or less. With very low spray densities some of the porosity is inter-connected so that diffusion of oxygen or other gases into the interior may occur on exposure to air, leading in some cases to internal oxidation, unless the deposit is consolidated by working. In such cases careful hot working to avoid solution of the dispersed particles will lead to a residual porosity well below 5 percent which is not inter-connected. No danger of internal oxidation then occurs on exposure to air.

Spray density is also a factor affecting cooling rates, the importance of which has been noted. The combination of the spray density and the speed of the substrate should be such that the deposition rate does not exceed 1 mm/s for the first millimeter (and should be still less at greater thicknesses). The speed of the substrate may be artificially increased for this purpose by scanning or reciprocating the substrate and/or the spray. In the spray, the gas:metal ratio is preferably 200 to 1000 liters/kg, in which regime most of the heat is removed by the gas. Above 1000 liters/kg, the spray might solidify before even reaching the substrate.

Although cold compaction may give a satisfactory product, hot working with the precaution described above has been found particularly effective in improving the cohesion between individual sprayed matrix particles in the deposit. Hot working is here defined as being plastic deformation carried out at a temperature above the recrystallisation temperature of the lowest melting constituent, which is usually from 0.4 to 0.5 of its melting-point on the Absolute Temperature Scale.

Figure 2:
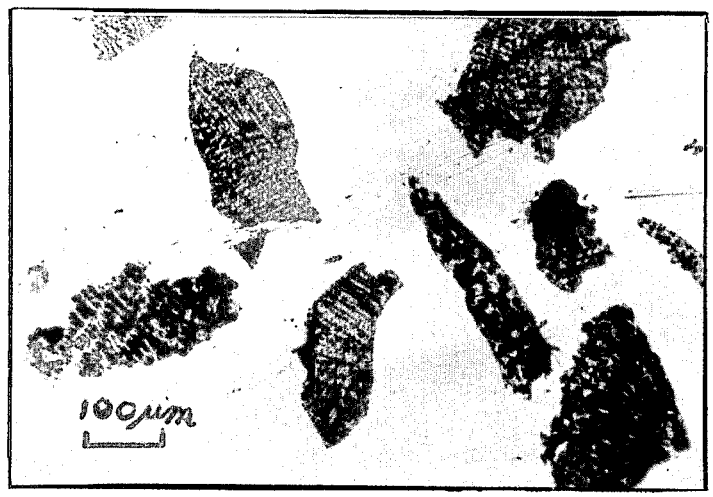

The invention will now be described by way of example with reference to the accompanying drawings in which:

FIG. 1 shows a longitudinal section of apparatus for performing the method according to the invention, and FIG. 2 is a micrograph of material made by the method.

The example chosen is the production of an aluminium-chilled iron composite bonded to a steel backing strip.

Molten aluminium 1 is fed from a holding crucible 2 through a refractory tube 3 into the atomising chamber 4. The flow of aluminium is controlled by a stopper rod 5, which can be adjusted vertically, and further molten aluminium is added to the crucible 2 from time to time, in order to maintain a suitable metal level. The stream of molten aluminium 6 issuing from the refractory tube 3 falls vertically to a point where jets of nitrogen 7 impinge on the stream and atomise it. The jets of nitrogen 7 issue from eight nozzles 8, of which only two are shown in FIG. 1, arranged in the atomiser block 9 in annular formation around the refractory tube 3. The nitrogen is supplied at a pressure of 150 psi through delivery pipe 10. The gas:metal ratio is 1000 l/kg, and the metal deposition rate is 5 kg/minute. Chilled iron powder of 50–150 m size entrained in nitrogen is delivered at a pressure of 140 kPa (20 psi) through the delivery pipe 11 to the annular space 12 between the refractory tube 3 and the atomiser block 9.

Care must be taken to ensure that the internal surfaces of delivery pipes and parts of the apparatus through which particles entrained in gas pass are free from projections or crevices where particles might lodge and obstruct the flow. Similarly, the delivery pipes should be made of sufficient diameter to avoid such obstructions.

The delivery pipe 11 joins the annular space 12 tangentially so that the chilled iron particles entrained in nitrogen spiral downwards around the refractory tube 3, until they meet the metal stream 6. Thus both the molten aluminium stream and the chilled iron particles are enclosed by a circular curtain of atomising gas formed by the eight jets of nitrogen issuing from the nozzles 8 attached to the atomising block 9. The chilled iron particles are thoroughly mixed with the molten aluminium during atomising and are deposited together as a layer 13 on steel substrate 14, passing through the bottom part of the atomising chamber 4. Also, some flake graphite is included. As proportions of the aluminium (by weight) they are entrained with the molten aluminium at a rate of 15% (iron) and 1% (graphite). The temperature of the aluminium to be atomised is 700° C., the melting point of aluminium is 660° C. and of the chilled iron is around 1300° C. Before receiving the deposit the steel substrate in the form of a long strip 300 mm wide is prepared by grit blasting the top surface and then passing it through an electric pre-heating furnace 15 in which a reducing atmosphere is maintained, to reduce any surface iron oxide prior to entering the spray chamber.

A cold substrate is suitable when the deposit is to be separated from the substrate. The shape of the substrate will determine the shape of the deposit. Thus a substrate in the form of a strip will produce a deposited strip having a similar form, whereas a substrate having a complex shape will act as a pattern for the deposit which if removed will then be a negative of that shape. If the deposit is to be permanently bonded to the substrate, it is usually preferable to preheat the substrate (which will, in the case of strip, subsequently form the backing strip) to enhance the strength of the bond. Preparation of the substrate surface by cleaning, light grit blasting or scratch brushing before it is introduced into the reducing atmosphere of the preheating surface is advantageous.

Suitable preheating temperatures when the aluminium-chilled iron deposit is required to remain bonded to the steel substrate have been found to lie between 300° C. and 450° C. In this case, a temperature of 400° C. was maintained. After the deposit has been sprayed onto the substrate, the spray being scanned transversely to the strip at 10 cycles/sec and the strip moving at such a speed as to give a coating thickness of 2 mm, the bonded strip is passed through a chamber 16 leading directly into the nip of the rolls 17 of a rolling mill. The chamber 16 is fed with nitrogen from the atomising chamber 4 to ensure that no oxidation of the deposit occurs before its compaction by rolling. Its porosity is thereby reduced from about 5 percent directly after spraying to less than 1 percent after hot rolling between the rolls 17 of the rolling mill. The bonded and compacted strip 18 emerging from the rolling mill, wherein the compaction was such as to impart an elongation of about 1%, can subsequently be processed by normal means in air without danger of internal oxidation. After use the nitrogen and any undeposited aluminium or chilled iron powder is exhausted through the outlet 19 at the bottom of the atomising chamber.

It will be appreciated that the process can run continuously by feeding aluminium into the holding crucible 2 to maintain fairly constant levels. It will also be appreciated that the process can either be run continuously to produce continuous lengths of multi-phase material or intermittently by temporarily interrupting the aluminium and iron particles flow to produce single items of multi-phase material which may, for instance, have a complex form and non-uniform cross section.

Although the example described gives an axi-symmetric distribution of spray and particles, it is possible to modify the shape of the spray from a cone to a flattened shape having an elongated cross section. This is best achieved by positioning the holes or slots through which the atomising gas is delivered in such a way as to bring about a flattening of the jet of spray (and particles). Similarly, it is possible to use a multiplicity of such sprays in order to cover a wide substrate or to use them successively in order to build up a suitable thickness.

It is sometimes desirable to pre-coat the steel base strip to increase adhesion thereto before depositing a sprayed layer. A coating should be chosen which is compatible with the deposit and preferably does not form a thick, brittle interface with the steel. In the example given above, a pre-coated steel base strip could be prepared by nickel plating, dip coating or spraying thinly with molten aluminium or zinc, or powder coating with aluminium or aluminium alloy.

As the particles material is soluble in the matrix, the molten matrix splats will usually wet the surface of the particles during co-deposition. In these circumstances the particle will usually remain bonded to the matrix as it cools down to room temperature. This represents a distinct advantage when compared with most ceramic particles (e.g. metallic and other oxides) which, being insoluble and not wetted by the matrix metal, have poorer bonding to the matrix and more readily become detached when at a free surface. The bonding of the particles to the matrix has a beneficial effect on the mechanical properties enabling plastic deformation by rolling, pressing or drawing to be performed without fracture. In the case of aligned graphite flakes in steel, the resulting multi-phase material retains sound-deadening properties for such components as tappet covers.

An example of making a multi-phase material which is separated from the substrate is as follows. A molten alloy of aluminium containing 4 weight % silicon was held at 700°–710° C. (solidus=660° C.) and gas-atomised as described. Entrained in the spray (1000 l gas:1 kg aluminium) was 20 weight % of chilled iron. The spray, which travelled at about 13 m/s, was directed towards a cast-iron substrate 500 mm wide and 25 mm thick held at 200° C., and was oscillated to scan the substrate at 10 Hertz. At the instant of striking the substrate, the spray had cooled so far as to be about one-quarter solid; the remaining three-quarters was quite adequate to produce a reasonably consolidated deposit. (It is a general feature of spraying alloys that, at the instant of landing, they should be well above the solidus temperature and preferably at least three-quarters of the way towards the liquidus.)

The solidified product was then removed from the substrate, rapidly reheated to 380° C. and hot-rolled to form strip from which stair-edging section was formed.

I claim:

1. A method of making a multi-phase metallic material comprising elemental or metallic particles of a high-melting-point phase dispersed in a lower-melting-point metallic matrix phase (the particles being of a material which would be soluble under equilibrium conditions in the matrix material at the melting point of the matrix material), wherein the method comprises forming a spray of molten matrix material, introducing the particles into the spray, and directing the spray onto a colder surface to solidify the matrix spray and form the multi-phase material, wherein the temperature of the spray is below the melting point of the particles, with the result that, despite the notional solubility of the particles material, no perceptible dissolution of particles occurs.

2. A method according to claim 1, wherein the cooling rate of the matrix phase is sufficient to cause sufficiently rapid solidification thereof such that the particles are in contact with molten matrix material for the duration of at most 100 ms.

3. A method according to claim 2, wherein the said cooling rate in the region of the solidus is at least $10^3$ K/s.

4. A method according to claim 3, wherein the said cooling rate in the region of the solidus is at least $10^4$ K/s.

5. A method according to claim 1, further comprising separating the resulting multi-phase material from the surface on which it was formed.

6. A method according to claim 1, wherein the surface onto which the spray is directed is not warmer than half the melting point or solidus temperature of the matrix material on the Absolute Temperature Scale.

7. A method according to claim 1, wherein the matrix material is aluminium including an aluminum alloy.

8. A method according to claim 7, wherein the matrix material is an aluminium/zinc alloy.

9. A method according to claim 7, wherein the particles are of iron or steel.

10. A method according to claim 9, wherein the particles are within the size range 10–1000 μm.

11. A method according to claim 1, wherein the matrix material is fed as a molten stream to a gas atomising nozzle, the method further comprising injecting the said particles into the atomised stream.

12. A method according to claim 11, wherein the particles are injected into the atomised stream by entrainment in a stream of gas.

13. A method according to claim 11, wherein the ratio gas:metal is 200 l/kg to 1000 l/kg.

14. A method according to claim 1, wherein the proportion of the particles to the whole of the multi-phase material is from 1% to 50% by volume.

15. A method according to claim 14, wherein the said proportion is from 1% to 35% by volume.

16. A method according to claim 1, wherein the spray density and the speed of the surface onto which the spray is directed are in combination such that the deposition rate does not exceed 1 mm/s.

17. A method according to claim 1, further comprising hot working the solidified multi-phase material.

* * * * *